Figure 1:
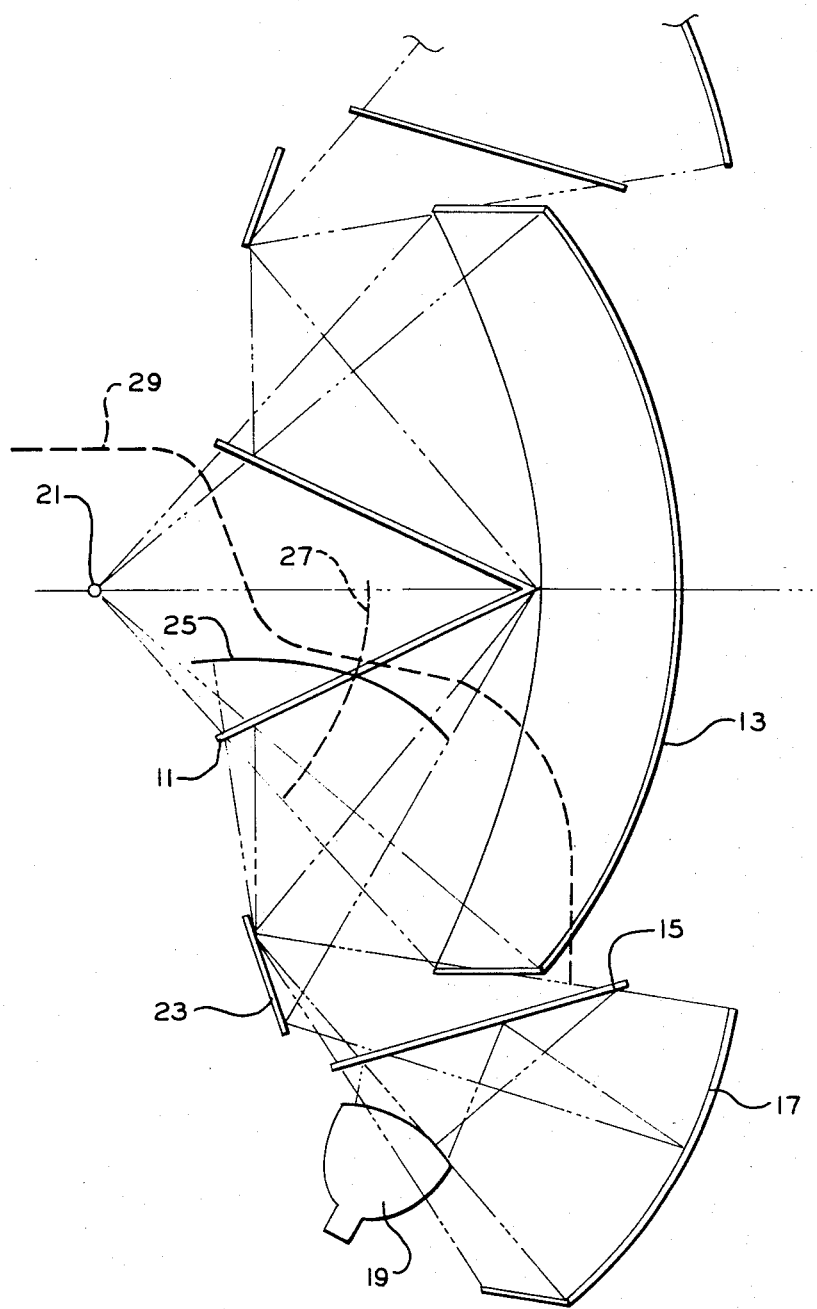

350-174.  SR
01-09-73  OR  3,709,581

United States Patent [19]
McGlasson

[11] 3,709,581
[45] *Jan. 9, 1973

[54] WIDE ANGLE INFINITY IMAGE VISUAL DISPLAY

[75] Inventor: Frank W. McGlasson, Windsor, N.Y.

[73] Assignee: The Singer Company, New York, N.Y.

[ * ] Notice: The portion of the term of this patent subsequent to May 2, 1989, has been disclaimed.

[22] Filed: Feb. 5, 1971

[21] Appl. No.: 112,924

[52] U.S. Cl...............350/174, 35/12 N, 178/7.88, 350/55
[51] Int. Cl..................G02b 17/06, G02b 27/14
[58] Field of Search...............350/55, 174, 169, 292; 178/7.85, 7.88, 7.89, DIG. 35; 356/251, 252; 35/12 N, 25; 353/10.2, 12, 13

[56] References Cited

UNITED STATES PATENTS

| 3,432,219 | 3/1969 | Shenker et al.............350/55 X |
| 3,514,871 | 6/1970 | Tucker.........................35/12 N |

FOREIGN PATENTS OR APPLICATIONS 953,440  3/1964  Great Britain..................353/99

OTHER PUBLICATIONS

LaRussa, Visual Spaceflight Simulators, Optical Spectra, pp. 58–63 (9/10–1969)
Ferrand, A 'Pancake Window' Display System, Optical Spectra, p. 34 (1–1971)

Primary Examiner—David Schonberg
Assistant Examiner—John W. Leonard
Attorney—Francis L. Masselle, Charles S. McGuire and William Grobman

[57] ABSTRACT

An improved wide angle visual display made up of a plurality of narrow angle reflective mirror-beamsplitter displays shaped as spherical segments. By using a second reflective mirror-beamsplitter combination with each narrow angle display to provide an aerial image input, the field of view of each narrow angle display is increased and thus fewer narror angle displays are required to make a wide angle display of a given size.

9 Claims, 2 Drawing Figures

Frank W. McGlasson
INVENTOR.

BY Charles S. McGuire
ATTORNEY

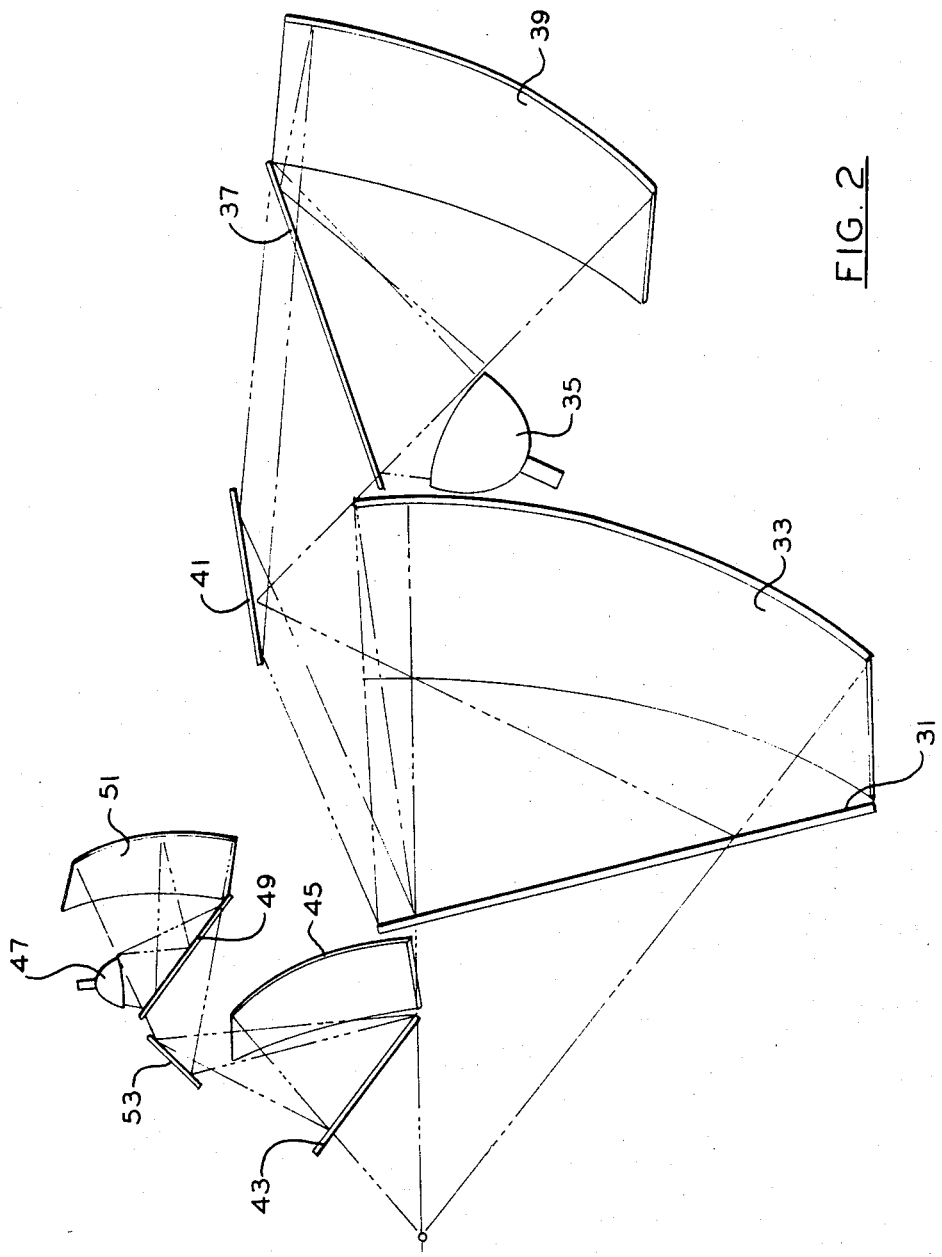

WIDE ANGLE INFINITY IMAGE VISUAL DISPLAY

This invention relates to visual systems and more particularly to an improved wide angle visual system.

The use of visual display systems in trainers, particularly grounded aircraft trainers, has shown a steady increase. The cost of operating aircraft has risen and made training in such aircraft very expensive, thus creating a demand for trainers with increased capabilities.

One of the primary areas where this demand is great is that dealing with visual display systems. Ideally a trainee should have as wide a field of view in the trainer as he does in the actual aircraft. This is particularly true in military applications where the trainee is given weapons training and must locate targets over a wide field of view. It is also desirable to have an infinity image type display to make the scene displayed more realistic.

A visual system which provides a wide angle display, and which is hereby incorporated by reference, is disclosed in U.S. application Ser. No. 67,385 now U.S. Pat. No. 3,659,920, filed Aug. 27, 1970 by the same inventor and assigned to the same assignee as the present invention. Although the arrangement disclosed therein works quite well, it requires a large number of individual displays. The present application discloses an improved system which reduces the number of displays required by increasing their field of view.

It is the object of this invention to reduce the number of individual displays needed to assemble a wide angle visual display matrix.

Another object is to provide an improved visual system for use in trainers.

A further object is to provide such a display which will be easily mounted on the cockpit of an aircraft trainer.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

The principle deficiency in the visual display system of the referenced application Ser. No. 67,385 now U.S. Pat. No. 3,659,920, is the relatively narrow vertical field of view of the individual displays which, in practice, is limited to less than 30°. The reason for this can be seen from an examination of FIG. 6 of the referenced application. The lower limit of the field of view of each individual mirror-beamsplitter — CRT display is defined by the intersection of the mirror and beamsplitter, while the upper limit is the line above which the CRT is visible to an observer positioned at the nominal eyepoint. Moving the CRT to enlarge the field of view would make more of it directly visible.

A solution to this problem is shown in FIG. 1 of the present application. Beamsplitter 11 and spherical mirror 13 are arranged in a manner similar to the mirror and beamsplitter in the reference. However, instead of a CRT input directly to mirror 11, the display now has as an input an aerial image formed by beamsplitter 15 and spherical mirror 17 which have CRT 19 as an input. The image thus formed is reflected by mirror 23 to form a real image 25. Because of the reflection by beamsplitter 11 the image 25 will look to mirror 13 like the image indicated by dotted line 27. The image cannot be seen by the observer and thus may be located to obtain maximum field of view. By using this intermediate image a vertical field of view of more than 40° may be obtained.

In addition, FIG. 1 shows how two such displays may be combined to obtain a total vertical field of view of 80° or more. The principles involved in the combination are similar to those disclosed in the referenced application. However, because of the increased field of view a suitable display may be made using only two tiers. In addition it is possible to use a single spherical mirror 13 for both the upper and lower tiers.

With an arrangement as described above a horizontal field of view of 80° may be obtained. The horizontal field of view may be enlarged by horizontally butting a plurality of the displays shown in FIG. 1 together as described in the referenced application. Thus, for example, a total field of view of 80° vertical by 240° horizontal may be obtained using only three horizontally abutting displays of the double vertical tiered type shown in FIG. 1. To obtain the same field of view with the arrangement of the referenced application would require more than 15 individual displays. (i.e., 15 displays in three tiers results in a 75° vertical by 225° horizontal field of view)

The arrangement shown in FIG. 1 has one major deficiency. It is difficult to mount on a simulator cockpit. The dotted lines 29 show the outline of a possible cockpit configuration and how the lower portion of the display would run into the cockpit structure.

FIG. 2 shows an arrangement which avoids this problem. Instead of using a single spherical mirror, two different sized tiers are constructed using the principles of the referenced application. The lower display comprising beamsplitter 31 and spherical mirror 33 has an an input the aerial image generated by CRT 35, beamsplitter 37, and mirror 39 reflected off mirror 41. Likewise the upper display comprising beamsplitter 43 and mirror 45 has as its input the image generated by CRT 47, beamsplitter 49 and mirror 51 reflected off mirror 53. Since the lower display is set back from the upper one, mounting on a cockpit is facilitated.

Tiers of the upper and lower displays may then be butted together to obtain the desired horizontal field of view as shown in the referenced application. To obtain a field of view of 80° vertical by 240° horizontal two tiers of upper and lower displays each made of three individual units, or a total of six displays must be used. As previously mentioned, to obtain the same field of view without using intermediate images, more than 15 displays are needed. Even considering the fact that the displays in the present application are twice as complex as those in the reference, a reduction from 15 to 12 will result. In addition system complexity is reduced since fewer joints need be matched.

Thus, an improved wide angle display which may be constructed using fewer small angle displays has been shown. Although particular mention has been made of the use of such a display in aircraft simulators, it is equally applicable wherever a wide angle display is required. It also is obvious that various modifications may be made to the disclosed embodiment without departing from the principles of the invention.

What is claimed is:

1. Wide angle display apparatus comprising:
   a. a first tier comprising one or more narrow angle reflective mirror beamsplitter displays having as one or more inputs aerial images generated by one or more mirror-beamsplitter combinations, said first tier shaped as a first spherical segment bounded on the top and bottom by lines of latitude:
   b. 2 second tier comprising one or more narrow angle reflective mirror-beamsplitter displays having as one or more inputs aerial images generated by one or more mirror beamsplitter combinations, said second tier shaped as a spherical segment bounded at the top and bottom by lines of latitude, said bottom line of said second tier having the same angular spacing from the bottom line of said first tier as the top line of said first tier, the centers of said first and second spherical segments being coincident and located so that a plane passing through said center and intersecting the surface of said first tier to form a line of longitude will also intersect the surface of said second tier.

2. The invention according to claim 1 wherein one or more of said narrow angle displays in said first tier and one or more of said narrow angle displays in said second tier share a common spherical mirror.

3. The invention according to claim 1 wherein said tiers are bounded on the sides by lines of longitude.

4. The invention according to claim 3 wherein said tiers are bounded by the same lines of longitude.

5. The invention according to claim 1 wherein said tiers comprise a plurality of narrow angle displays arranged in horizontally abutting relation.

6. The invention according to claim 5 wherein each of said plurality of displays is shaped as a spherical segment bounded by lines of latitude and longitude.

7. The invention according to claim 1 wherein said first tier is a section of a different sphere than said second sphere.

8. The invention according to claim 7 wherein the sphere of which said second tier is a segment has a radius less than the sphere of which said first tier is a segment.

9. The invention according to claim 7 wherein the inputs to said one or more of said mirror beamsplitter combinations comprise CRTs.

* * * * *